(12) United States Patent
Fan

(10) Patent No.: US 7,649,725 B2
(45) Date of Patent: Jan. 19, 2010

(54) POWER LIMITING CIRCUIT

(75) Inventor: Ben Fan, Heshan (CN)

(73) Assignee: He Shan Lide Electronic Enterprise Company Ltd., Heshan (CN)

( * ) Notice: Subject to any disclaimer, the term of this patent is extended or adjusted under 35 U.S.C. 154(b) by 223 days.

(21) Appl. No.: 11/954,803

(22) Filed: Dec. 12, 2007

(65) Prior Publication Data

US 2008/0265803 A1 Oct. 30, 2008

(30) Foreign Application Priority Data

Apr. 25, 2007 (CN) .................. 2007 1 0027705

(51) Int. Cl.
*H02H 7/00* (2006.01)
(52) U.S. Cl. ...................... 361/93.9; 361/18
(58) Field of Classification Search .............. 361/18, 361/93.7–93.9; 315/88
See application file for complete search history.

(56) References Cited

U.S. PATENT DOCUMENTS 6,781,316 B2 * 8/2004 Oda ........................ 315/88
6,998,818 B2 * 2/2006 Xiong et al. .............. 320/134

* cited by examiner

*Primary Examiner*—Danny Nguyen
(74) *Attorney, Agent, or Firm*—Lucas & Mercanti, LLP

(57) ABSTRACT

A power limiting circuit for controlling the power of the incandescent lamp not to overrun the rated power limit includes a sampling circuit that consists of two resistors connected in parallel. A control chip compares the received sample voltage with the standard voltage then outputs control signal to drive the conduction of a SCR (silicon controlled rectifier) to change the inner states of contacts of a relay so as to further control the on/off between the input and the output. Based on this control process and technique, this invention prevents the employment of incandescent lamps having a greater power than power rating. Besides, a bi-operational amplifier circuit is used to fulfill the whole examination and control perfectly.

10 Claims, 2 Drawing Sheets

POWER LIMITING CIRCUIT

BACKGROUND OF THE INVENTION

The present invention relates to the electronics field, and more particularly, to a power limiting circuit for controlling the power of incandescent lamp not to overrun the predetermined power rating.

The conventional circuit for controlling or driving an incandescent lamp is commonly in an absence of the power limitation and protection. When an incandescent lamp is installed, if peripheral power that is greater than the power rating of the incandescent lamp is used by a mistake due to not knowing the type or power of the incandescent lamp, the increase of current will be induced and finally result in the burning out of lamps or wires and even the risk of fire.

At present, with respect to the above problems, some users provide a new technical solution that a coil is used to control the increase of the power of incandescent lamp. When the power of the incandescent lamp increases, the voltage across the coil will increase, which is fed back to a integrated control circuit, and the circuit will output a control signal to the related peripheral circuit to control the turnoff between the wire and the load so as to protect the incandescent lamp and avoid dangerous emergencies. This technique is widely used nowadays. However, the shortcoming is that the coil can be easily influenced by temperature, when the coil is connected to power supply, the current of the coil will increase, the voltage across the coil will increase due to the rapid increase of temperature, and thus the integrated control circuit would output a false signal to control the turnoff between the output and the load. The false signal will cause the light quenching of incandescent lamp. Moreover, the circuit is lack of temperature compensation circuit and fails to work stably.

SUMMARY OF THE INVENTION

The object of the present invention is to solve the mentioned problems and provide a power limiting circuit having the characteristics of temperature compensation and stable circuit working, wherein a bi-operational amplifier circuit is used to fulfill the whole examination and control perfectly.

To achieve the above-mentioned object, a power limiting circuit comprises:

a relay for controlling the on/off of a load;

a silicon controlled rectifier (SCR) for controlling the switching of the relay between normally open contact (NO) and normally closed contact (NC);

a sampling circuit for sampling the output loop current;

a control chip for comparing the voltage value of the sampling circuit with a standard voltage value and triggering the conduction of SCR;

a low-voltage direct current (DC) power supply for supplying the standard voltage to the control chip;

wherein the control chip is provided with a standard voltage end and a sampling end, the sampling end is divided into two parts, one part is connected in series to a resistor R2 and then connected to negative end of the low-voltage direct current power supply, the other part is connected to the sampling circuit that consists of two parallel connected resistors R9 and R10. One end of the sampling circuit is connected in series to resistors R11 and R8 in sequence, and then connected to sampling end of the control chip, the other end of the sampling circuit is connected to negative end of the low-voltage direct current power supply.

The resistor R8 that is connected to the sampling circuit is a sliding rheostat.

The standard voltage end of the control chip is connected between the resistors R4 and R17, the other end of the resistor R4 is connected to the third pin of a regulator U1 in the power-voltage direct current power, the other end of resistor R7 is connected to negative end of the low-voltage direct current power.

The silicon controlled rectifier (SCR) is a single directional silicon controlled rectifier.

The trigger end of the silicon controlled rectifier is connected to a reset circuit.

The reset circuit is formed of a reset switch that is connected in series with a resistor and then connected in parallel with another resistor.

The control chip is a bi-operational amplifier.

The load is an incandescent bulb.

The rated limitation power of the load is at least equal to 190 W; the voltage $U_3$ of the third pin of regulator U1 is 15V, and the resistances have the following values: R9//R10=0.167Ω, R11+R8=3.375KΩ, R4=18KΩ, R2=10K, R7=240Ω.

Comparing with the power limiting circuit of the prior art, the present invention is of the following advantages:

1. Two resistors in parallel is used as the sampling circuit, so that the examination is only slightly influenced by temperature, and thus the abrupt change of the output voltage to sampling end that cause the control chip to output a false signal to the load could be avoided.

2. One end of resistor in sampling circuit is connected in series with two protective resistors, so that not only does the sampling result appear precisely but also the current can avoid changing suddenly. It shows a good feature of temperature compensation.

3. A bi-operational amplifier integrated by two comparators is used as the core control chip to drive the conduction of the single directional SCR, which possesses the merits of accurate examination and control, excellent function, lower price and stable circuit working.

BRIEF DESCRIPTION OF THE DRAWINGS

The structural and operational characteristics of the present invention will be better understood from the following description, relating to the attached drawings which show illustratively but not restrictively examples of the invention. In the drawings.

DETAILED DESCRIPTION OF THE INVENTION

Figure 1:
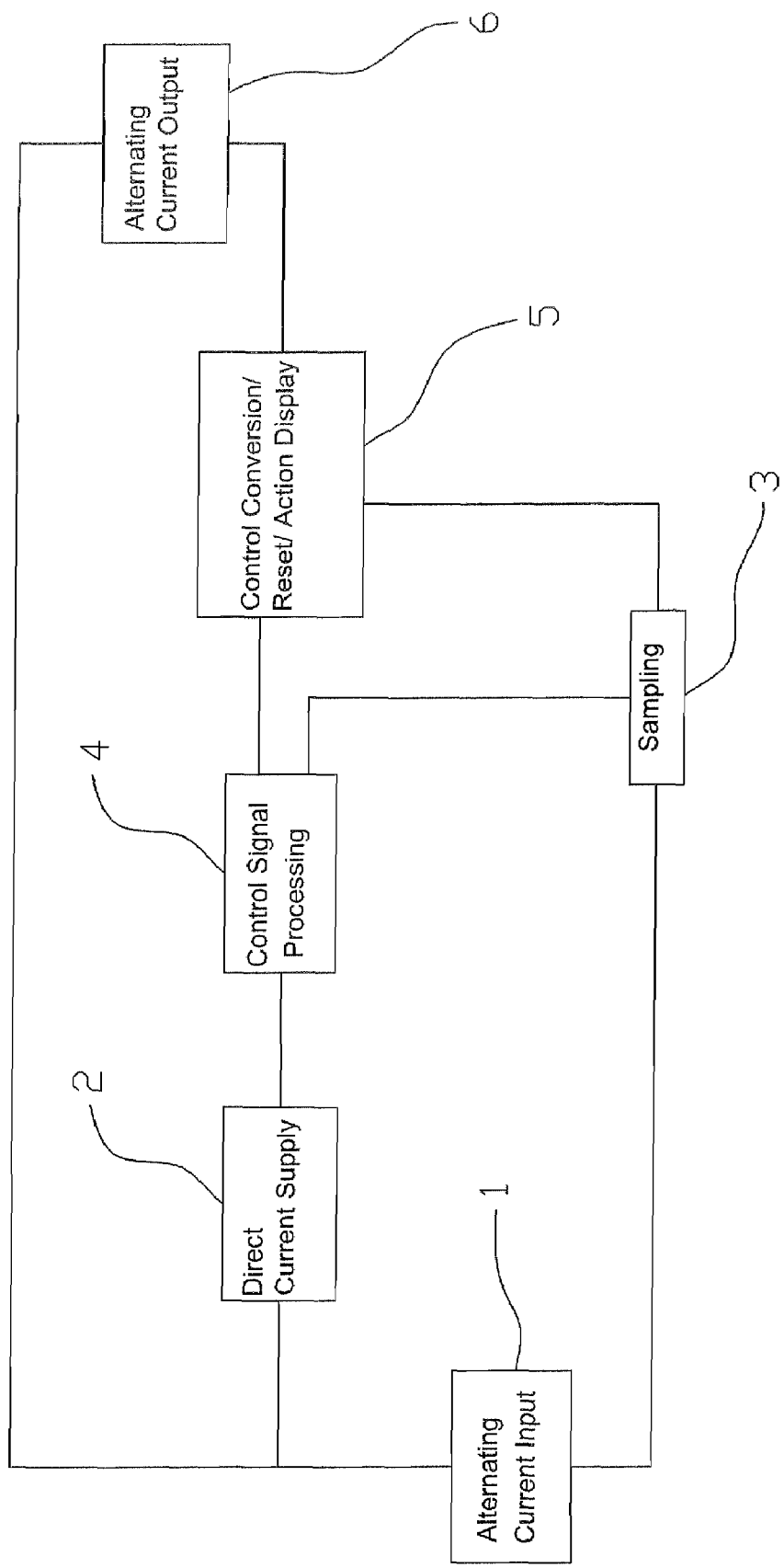
FIG. 1 is a circuit diagram according to an embodiment of the present invention.

Referring to FIG. 1, a power limiting circuit is provided to control the power of the incandescent lamp not to overrun the predetermined power rating. As shown in FIG. 1, one end of Part 1 (alternating current input) is connected to one end of Part 6 (alternating current output) and the input end of Part 2 (direct current supply) and one end of Part 5 (control conversion/reset/action display); the other end of Part 1 (alternating current input) is connected to the input end of Part 3 (sampling); the output end of Part 2 (direct current) is connected to the input end of Part 4 (control signal processing); the output end of Part 4 (control signal processing) is connected to Part 3 (sampling) and Part 5 (control conversion/reset/action display); the output end of Part 3 (sampling) is connected to Part 5 (control conversion/reset/action display); the output end of Part 5 (controlling changeover/reset/action display) is connected to the other end of Part 6 (alternating current output).

Figure 2:
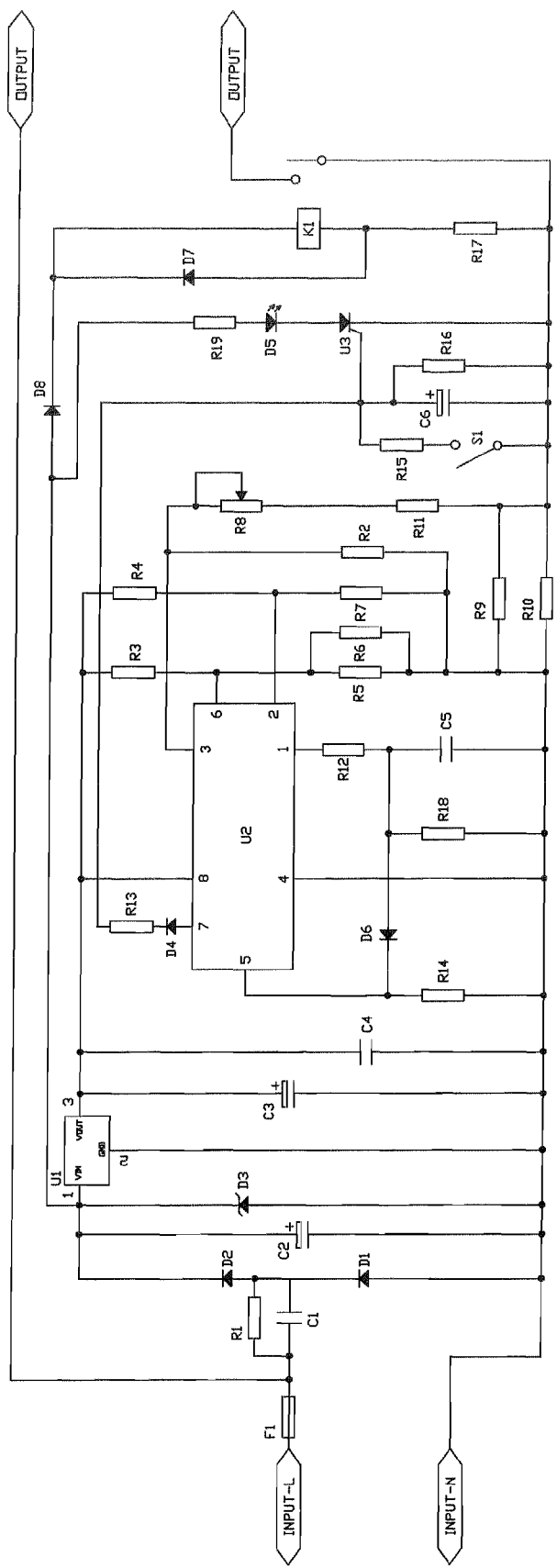
FIG. 2 is a circuit principle diagram according to an embodiment of the present invention.

Referring to FIG. 1 and FIG. 2, when the power of the load is smaller than the power rating, an alternating current is inputted by Part 1 (Alternating current input), one end of Part 1 (alternating current input) is connected through a fuse F1 to one end (or positive end of incandescent lamp) of Part 6 (alternating current output), the other end of Part 1 (alternating current input) is connected in series to resistor R10 and then to the other end (or negative end of the incandescent lamp) of Part 6 (alternating current output) through the normally closed contact of the relay K1. When the electrical power is supplied, the normally open contact of the relay K1 is closed, and the incandescent lamp is on.

Contrarily, when the power of the load is greater than power rating, an alternating current is inputted by Part 1 (alternating current input) to Part 2 (direct current supply) to output the direct current for the control chip U2 and other circuits, and at the same time a standard voltage for comparing is provided, wherein the Part 2 (direct current supply) comprises: a protection circuit consisting of a capacitor C1 and a resistor R2; a rectification circuit consisting of diodes D1 and D2; a voltage stabilizing circuit consisting of a Zener diode D3 and a three-pin regulator U1; a filter circuit consisting of electrolytic capacitors C2,C3 and a capacitor C4.

Meanwhile, when the power of the load is greater than the power rating, the current connected to output loop of relay K1 increases accordingly. The current flows through Part 3 (sampling part), the voltage across the sampling circuit which consists of two parallel connected resistors R9 and R10 will increase. The sampling circuit is connected in series to a resistor R11 and a sliding rheostat R8 in sequence, and then connected to the third pin of control chip U2. The third pin is further connected to the resistor R2 in series, and then connected to the other end of sampling circuit and to the negative end of direct current power. The third pin of regulator U1 is connected in series to Resistors R4 and R7 in sequence and then connected to negative end of the direct current power. The second pin of the control chip U2 is connected in series between resistors R4 and R7, which provides a standard voltage to the second pin of the control chip U2 for comparing. The control chip U2 compares the sampling circuit voltage with the standard voltage, and when the voltage of the third pin is higher than that of the second pin, the seventh pin of the control chip U2 will output a high level signal which travels through a diode D4 and a resistor R13 and then reaches the control pole of the silicon controlled rectifier U3. The cathode of the silicon controlled rectifier U3 is connected to the negative end of resistor R19, the anode of the silicon controlled rectifier is connected to the positive end of the direct current power through a LED D5 and a resistor R19. When the voltage signal acts upon the control pole, which triggers the conduction of the silicon controlled rectifier U3 immediately, the anode of the relay K1 is connected to the anode of the silicon controlled rectifier U3, when the silicon controlled rectifier U3 becomes conductive, and a certain voltage is produced, the voltage which drives the conduction of the relay K1 decreases, then the current which flows through the inner coil of the relay K1 decreases correspondingly, and the electromagnetic suction force will disappear accordingly. The gag bit returns to the original position under the counterforce of the spring so as to cutoff the connection between the relay K1 and the output or the negative end of the incandescent lamp, then the light of the incandescent lamp quenches thereby.

When the power of the load recovers within the power rating, by closing a reset switch S1 in the reset circuit by hand, the voltage in electrolytic capacitor C16 (the control voltage of silicon controlled rectifier U3) will discharge through resistor R15. When the voltage in control end of silicon controlled rectifier U3 is lower than the conduction voltage of silicon controlled rectifier U3, the silicon controlled rectifier U3 is cut off and the normally open contact will change to the normally closed contact to connect the input to the output, and the load will start to work normally.

Several embodiments of the present invention in which the power rating is equal to 190 W are described as follow:

In an embodiment of this invention, the resistors R9//R10=0.167Ω, R11+R8=3.375 KΩ, R2=10 KΩ, R7=240Ω, R4=18 KΩ, the voltage $U_3$ Of the third pin of regulator U1 is 15V, and the voltage $U_2$ of the second pin of control chip U2 is 0.2V. When the power of the load is equal to 190 W, the current of the load is equal to 1.5±0.03 A, the sampling voltage of the third pin of control chip U2 is higher than the voltage $U_2$ (0.2V) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, so that the electromagnetic suction force disappears, and the gag bit returns to the original position under the counterforce of the spring to cut off the connection between the relay K1 and the output or the negative end of the incandescent lamp, then the light of the incandescent lamp quenches thereby.

In another embodiment of this invention, the resistors R9//R10=0.167Ω, R11+R8=7.75KΩ, R2=10KΩ, R7=180Ω, R4=18KΩ, the voltage $U_3$ of the third pin of regulator U1 is 15V, and the voltage $U_2$ of the second pin of control chip U2 is 0.15V When the power of the load is equal to 190 W, the current of the load is equal to 1.5±0.03 A, the sampling voltage of the third pin of control chip U2 is higher than the voltage $U_2$ (0.15V) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, and the electromagnetic suction force disappears, and the gag bit returns to the original position under the counterforce of the spring to cut off the connection between the relay K1 and the output or the negative end of the incandescent lamp, then the light of the incandescent lamp quenches thereby.

In another embodiment of this invention, the resistors R9//R10=0.167Ω, R11+R8=11.27KΩ, R2=10KΩ, R7=150Ω, R4=18KΩ, the voltage $U_3$ of the third pin of regulator U1 is 15V, and the voltage $U_2$ of the second pin of control chip U2 is 0.124V. When the power of the load is equal to 190 W, the current of the load is equal to 1.5±0.03 A, the sampling voltage of the third pin of control chip U2 is higher than the voltage $U_2$ (0.124V) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, and the electromagnetic suction force disappears, and the gag bit returns to the original position under the counterforce of the spring to cut off the connection between the relay K1 and the output or the negative end of the incandescent lamp, then the light of the incandescent lamp quenches thereby.

In another embodiment of this invention, the resistors R9//R10=0.167Ω, R11+R8=21.8KΩ, R2=10KΩ, R7=100Ω, R4=18KΩ, the voltage $U_3$ of the third pin of regulator U1 is 15V, and the voltage $U_2$ Of the second pin of control chip U2 is 83 mV When the power of the load is equal to 190 W, the current of the load is equal to 1.5±0.03 A, the sampling voltage of the third pin of control chip U2 is higher than the voltage $U_2$ (83 mV) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, and the electromagnetic suction force disappears, and the gag bit returns to the original position under the counterforce of the spring to cut off the connection between the relay K1 and the output or the negative end of the incandescent lamp, then the light of the incandescent lamp quenches thereby.

In another embodiment of this invention, the resistors R9//R10=0.167Ω, R11+R8=1.89KΩ, R2=10KΩ, R7=270Ω, R4=18KΩ, the voltage $U_3$ of the third pin of regulator U1 is 15V, and the voltage $U_2$ Of the second pin of control chip U2 is 0.22V. When the power of the load is equal to 190 W, the current of the load is equal to 1.5±0.03 A, the sampling voltage of the third pin of control chip U2 is higher than voltage $U_2$ (0.22 V) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, and the electromagnetic suction force disappears, and the gag bit returns to the original position under the counterforce of the spring to cut off the connection between the relay K1 and the output or the negative end of the incandescent lamp, then the light of the incandescent lamp quenches thereby.

A further embodiment of the present invention in which the power rating is equal to 380 W is described as follow:

In this embodiment, the resistors R9//R10=0.167Ω, R11+R8=37.22KΩ, R2=10KΩ, R7=240Ω, R4=24KΩ, the voltage $U_3$ of the third pin of regulator U1 is 15V, and the voltage $U_2$ Of the second pin of control chip U2 is 0.15V. When the power of the load is equal to 380 W, the current of the load is equal to 1.5±0.03 A, the sampling voltage of the third pin of control chip U2 is higher than the voltage $U_2$(0.15V) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, and the electromagnetic suction force disappears, and the gag bit returns to the original position under the counterforce of the spring to cut off the connection between the relay K1 and the output or the negative end of the incandescent lamp, then the light of the incandescent lamp quenches thereby.

A still further embodiment in which the power is equal to 100 W is described as follow:

In this embodiment, the resistors R9//R10=0.167Ω, R11+R8=2.43KΩ, R2=10KΩ, R7=240Ω, R4=24KΩ, the voltage $U_3$ of the third pin of regulator U1 is 15V, and the voltage $U_2$ of the second pin of control chip U2 is 0.15V. When the power of the load is equal to 100 W, the current of the load is equal to 1.5±0.03 A, the sampling voltage of the third pin of control chip U2 is higher than the voltage $U_2$ (0.15V) of the second pin, the seventh pin (output end) of the control chip U2 outputs a voltage signal to the silicon controlled rectifier U3 to trigger the conduction of the silicon controlled rectifier U3, then the relay K1 becomes conductive. Due to the fact that the anode of the relay K1 is connected to the anode of the silicon controlled rectifier U3 and the silicon controlled rectifier U3 becomes conductive, the positive end voltage of diode D8 which is connected in series to the relay K1 decreases, then the voltage which drives the relay K1 decreases accordingly, the current which flows through the inner coil of the relay K1 decreases, the electromagnetic suction force disappears, and the gag bit returns to the original position under the counterforce of the spring to cut off the connection between the relay K1 and the output or the negative end of the incandescent lamp, then the light of the incandescent lamp quenches thereby.

In above mentioned embodiments, the resistors R11 and R8 which is connected in series can be replaced by a single resistor. However, the manufacture process of resistors may be not accurate enough, so that the resistor R8 is preferred to be a sliding rheostat to assure the accurate sampling voltage. If the total resistance value of the resistors R11 and R8 is not equal to the predetermined value, the total resistance value can be adjusted by regulating the sliding rheostat R8 so as to close to the predetermined value. Considering the cost and working stability, the control chip U2 is preferred to be a bi-operational amplifier formed of two comparators, and the silicon controlled rectifier U3 is preferred to be a single-directional silicon controlled rectifier.

Although the present invention has been described in connection with preferred embodiment thereof, many other variations and modifications will now become apparent to those skilled in the art without departing from the scope of the invention. It is preferred, therefore, that the present invention should not be limited by the specific disclosure herein, but only by the appended claims.

What is claimed is:

1. A power limiting circuit, comprising:
a relay for controlling the on/off of a load;
a silicon controlled rectifier for controlling the switching of the relay between normally open contact and normally closed contact;
a sampling circuit for sampling an output loop current;
a control chip for comparing the voltage value of the sampling circuit with a standard voltage value and triggering the conduction of the silicon controlled rectifier;
a low-voltage direct current power supply for supplying the standard voltage to the control chip;
wherein the control chip is provided with a standard voltage end and a sampling end, the sampling end is divided into two parts, one part is connected in series to a resistor (R2) and then connected to negative end of the low-voltage direct current power, the other part is connected to the sampling circuit that consists of two parallel connected resistors (R9 and R10) one end of the sampling circuit is connected in series to resistors (R11 and R8) in sequence and then connected to sampling end of the control chip, the other end of the sampling circuit is connected to negative end of the low-voltage direct current power supply.

2. The power limiting circuit of claim 1, wherein the resistor (R8) that is connected to the sampling circuit is a sliding rheostat.

3. The power limiting circuit of claim 1, wherein the standard voltage end of the control chip is connected between the resistors (R4 and R17), the other end of the resistor (R4) is connected to the third pin of a regulator (U1) in the power-voltage direct current power, the other end of resistor (R7) is connected to negative end of low-voltage direct current power supply.

4. The power limiting circuit of claim 1, wherein the silicon controlled rectifier is a single directional silicon controlled rectifier.

5. The power limiting circuit of claim 4, wherein the trigger end of the silicon controlled rectifier is connected to a reset circuit.

6. The power limiting circuit of claim 5, wherein the reset circuit is formed of a reset switch that is connected in series with a resistor and then connected in parallel with another resistor.

7. The power limiting circuit of claim 1, wherein the control chip is a bi-operational amplifier.

8. The power limiting circuit of claim 2, wherein the control chip is a bi-operational amplifier.

9. The power limiting circuit of claim 1, wherein the load is an incandescent bulb.

10. The power limiting circuit of claim 2, wherein the rated limitation power of the load is at least equal to 190 W, the voltage $U_3$ of the third pin of regulator (U1) is 15V, and the resistances have the following values: R9//R10=0.167Ω, R11+R8=3.375KΩ, R4=18KΩ, R2=10K, R7=240Ω.

* * * * *